US011981048B2

(12) United States Patent
Yáñez-Barnuevo Malo et al.

(10) Patent No.: US 11,981,048 B2
(45) Date of Patent: May 14, 2024

(54) METHOD FOR THE PRODUCTION OF SOLID MOLDED ARTICLES MADE OF NON-WOOD PLANT MATERIALS

(71) Applicant: FELTWOOD ECOMATERIALES, S.L., Saragossa (ES)

(72) Inventors: Aránzazu Yáñez-Barnuevo Malo, Saragossa (ES); José Luis Diez Ferrer, Saragossa (ES); Emiliano Bernués Del Río, Saragossa (ES)

(73) Assignee: FELTWOOD ECOMATERIALES, S.L., Saragossa (ES)

( * ) Notice: Subject to any disclaimer, the term of this patent is extended or adjusted under 35 U.S.C. 154(b) by 294 days.

(21) Appl. No.: 17/633,183

(22) PCT Filed: Aug. 7, 2020

(86) PCT No.: PCT/EP2020/072245

§ 371 (c)(1),
(2) Date: Feb. 4, 2022

(87) PCT Pub. No.: WO2021/023862

PCT Pub. Date: Feb. 11, 2021

(65) Prior Publication Data

US 2022/0274283 A1 Sep. 1, 2022

(30) Foreign Application Priority Data

Aug. 8, 2019 (EP) .................................... 19382702

(51) Int. Cl.

| | |
|---|---|
| ***B27N 1/00*** | (2006.01) |
| ***B27N 3/00*** | (2006.01) |
| ***B27N 3/02*** | (2006.01) |
| ***B27N 3/04*** | (2006.01) |
| ***B27N 3/18*** | (2006.01) |

(52) U.S. Cl.

CPC ............... *B27N 1/00* (2013.01); *B27N 3/007* (2013.01); *B27N 3/02* (2013.01); *B27N 3/04* (2013.01); *B27N 3/18* (2013.01)

(58) Field of Classification Search

CPC . B27N 1/00; B27N 3/007; B27N 3/02; B27N 3/04; B27N 3/18

See application file for complete search history.

(56) References Cited

U.S. PATENT DOCUMENTS

| | | | | |
|---|---|---|---|---|
| 2002/0100565 A1* | 8/2002 | Riebel | E04C 2/16 | 162/99 |
| 2009/0188642 A1* | 7/2009 | Pittman | B27N 7/005 | 162/201 |
| 2010/0147474 A1* | 6/2010 | Grass | D21B 1/00 | 162/232 |

FOREIGN PATENT DOCUMENTS

| | | |
|---|---|---|
| EP | 0373726 A2 | 6/1990 |
| EP | 1327663 A1 | 7/2003 |
| JP | 2002138397 A | 5/2002 |

OTHER PUBLICATIONS

International Search Report and Written Opinion dated Oct. 26, 2020 for Application No. PCT/EP2020/072245, 16 pages.

* cited by examiner

*Primary Examiner* — Mary Lynn F Theisen
(74) *Attorney, Agent, or Firm* — Squire Patton Boggs (US) LLP

(57) ABSTRACT

The present invention provides a method for the production of a solid molded article comprising non-wood plant material, the method comprising the steps of (a) providing one or more fresh non-wood plant materials having a moisture content from 20% w/w to 99 w/w; (b) heating the fresh non-wood plant material at a temperature from 40° C. to 250° C., in particular, at a temperature from 60° C. to 140° C., and a pressure from 40 KPa to 750 KPa, in particular, for at least 0.5 h, maintaining the moisture content of the material equal to or higher than 20% w/w; (c) molding the heated material obtained in step (b); and (d) drying the molded material obtained in step (c). The invention also provides solid molded articles obtainable by the method of the invention.

17 Claims, No Drawings

METHOD FOR THE PRODUCTION OF SOLID MOLDED ARTICLES MADE OF NON-WOOD PLANT MATERIALS

CROSS-REFERENCE

This application is a 35 USC 371 national phase filing of PCT/EP2020/072245 filed on Aug. 7, 2020, which claims the benefit of and priority to European Patent Application EP19382702.9 filed on Aug. 8, 2019, both applications are incorporated herein by reference in their entirety.

TECHNICAL FIELD

The present invention belongs to the field of methods for the production of solid molded articles of plant origin. In particular, the invention relates to methods for the production of solid molded articles from non-wood plant materials.

BACKGROUND ART

The increasing pollution of lands and oceans has prompted extensive research into environmentally friendly materials. Natural fibers represent exceptional candidates for the production of bio-based objects due to their low cost, worldwide availability, low density, mechanical properties, sustainability, and biodegradability.

The most frequently used natural fibers are wood fibers. However, wood takes a long time to grow to useable sizes, its processing has elevated energy requirements and it commonly involves the use of polluting agents, such as formaldehyde. Furthermore, the wood-based industry contributes to the problem of deforestation that affects most countries.

Thus, in this context of declining raw material supply and increase demand of plant-based objects, non-wood lignocellulosic plants are seen as a good alternative. In particular, there have been some attempts to fabricate objects from the agricultural by-products generated after separating the edible parts of cultured plants. However, the methods disclosed in the prior art present various disadvantages. First, they generally use dry materials, such as wheat straw, which require the addition of water for rehydration. Furthermore, the separation of the rehydrated fibers requires energetically demanding steps, such as mechanical grinding or vapor explosion, or even dangerous alkali solutions. More importantly, the products obtained usually do not present the properties required for their use in industry.

In fact, in order to improve the characteristics of this type of products, natural fibers are commonly combined with plastics to produce composite materials. In these materials, natural fibers serve as reinforcement and they are embedded in a polymeric matrix along with compatibilisers or coupling agents. However, the non-natural components of these composites make their manufacturing production difficult and increase their environmental impact In summary, the complexity and high processing costs and long processing times of the methods developed so far has hindered the use of non-wood plant materials in industry. Thus, there is still a need for inexpensive and simple methods for the production of high-quality and environmental-friendly solid molded articles from non-wood plant materials.

SUMMARY OF INVENTION

The present inventors have developed an efficient and simple method for producing solid molded articles from non-wood plant materials. Surprisingly, the inventors found that when a specific type of plant materials were subjected to particular conditions of heating, the resulting material could be used for the production of high-quality objects by simple molding and drying.

This was highly unexpected because the prior art shows that the formation of objects from plant materials, in particular non-wood plant materials, requires the use of chemical binders or adhesives, or alternatively, high-energy steps such as compression molding at elevated temperatures.

Thus, the method of the invention allows the production of solid molded articles from inexpensive sources, such as agricultural by-products, and utilizing minimal amounts of energy because costly mechanical steps such as grinding are not necessary. Moreover, since the method uses the water naturally present in the fresh plant materials, it does not require the use of additional water.

Remarkably, the method of the invention is highly versatile. Without wishing to be bound by the theory, the use of fresh plant materials and the maintenance of a significant part of their natural moisture content during the heat treatment allows the degradation of intercellular pectin without affecting the overall structure of the cell walls. This leads to the formation of a pulp that upon molding and drying can acquire a wide variety of physical properties, such as extraordinary strength, remarkably low density, or high insulation properties.

The inventors also found that the objects produced with the method herein provided could be reutilized as many times as necessary by a simple process of rehydration, molding and drying, without losing their original characteristics, As a result the recycling/reusing of the material does not need any new, unused material at all, making unnecessary to add more unused material.

Thus, in a first aspect, the invention provides a method for the production of a solid molded article comprising non-wood plant material, the method comprising the steps of (a) providing one or more fresh non-wood plant materials having a moisture content from 20 w/w to 99% w/w with respect to the total weight of the plant material; (b) heating the fresh non-wood plant material at a temperature from 40° C. to 250° C., in particular, at a temperature from 60° C. to 140° C., and a pressure from 40 KPa to 750 KPa, in particular, for at least 0.5 h, maintaining the moisture content of the material equal to or higher than 20% w/w; (c) molding the heated material obtained in step (b); and (d) drying the molded material obtained in step (c).

Particularly, the non-wood plant material is the whole or any part of a non-wood plant, or a non-wood part of a wood plant.

Particularly, the fresh non-wood plant material is a non-wood plant material that after harvesting has not been preserved by drying.

In a second aspect, the invention provides a solid molded article obtainable by the process as defined in the first aspect.

DETAILED DESCRIPTION OF THE INVENTION

All terms as used herein in this application, unless otherwise stated, shall be understood in their ordinary meaning as known in the art. Other more specific definitions for certain terms as used in the present application are as set forth below and are intended to apply uniformly through-out the specification and claims unless an otherwise expressly set out definition provides a broader definition.

As used herein, the indefinite articles "a" and "an" are synonymous with "at least one" or "one or more." Unless indicated otherwise, definite articles used herein, such as "the" also include the plural of the noun.

As used herein, "moisture content" refers to the percentage ratio of the weight of free water present in the plant material to the total weight of the plant material. For instance, a 50% w/w moisture content means that a plant material of 100 g contains 50 g of water. There are several techniques known in the art which can be used to measure the moisture content of plant materials, such as Oven-drying method (ISO 638:2008) or electrical contact hygrometer (for instance, Velleman Contact hygrometer model DVM125).

Flexural strength and ultimate tensile strength test were made using 5.2 mm×4 mm size samples with 30 mm separation between supporting points. Load speed was 1 mm/min.

The term "fresh plant material" as used herein, refers to a plant material that after harvesting has not been preserved by drying, that is, a harvested plant material that maintains the same or substantially the same moisture content that it had in its in vivo state. As used herein, "substantially the same" refers to at least 85%, 90%, 95%, 96%, 97%, 98% or 99%. "Fresh plant material" may also refer to a plant material that has been harvested within the past 21 days. In a particular embodiments, the plant material has been harvested within the past 14 days, within the past 10 days, within the past 7 days, or within the past 3 days.

"Non-wood plant material" refers to the whole or any part of a non-wood plant, or a non-wood part of a wood plant, such as fruits and leaves. "Non-wood plants" refers to plants not having perennial woody stems. "Wood plants" refers to plants having perennial woody stems.

The parts of non-wood plants that can be used in the method of the invention include, without limitation, whole plants (e.g. a parsley plant), stems (e.g. chard), branches (e.g. tomato plant), leaves (e.g. cabbage), roots (e.g. ginger), and fruits (e.g. pineapple).

As used herein, the term "% w/w" or "percentage by weight" of a component refers to the weight amount of the single component relative to the total weight of the composition or, if specifically mentioned, of another component.

As used herein, the term "vegetable" refers to a non-wood (i.e. herbaceous) plant which has an edible portion which is consumed by humans in either raw or cooked form. The edible portion may be, without limitation, a root, a tuber or storage stem, the stem, a bud, a bulb, a petiole or leafstalk, a leaf, an immature flower, a seed, the immature fruit or the mature fruit.

The term "agricultural product" refers to the parts of a cultivated plant destined to human or animal consumption. The term "agricultural by-product" refers to the parts of a cultivated plant that are not destined or not suitable to human or animal consumption, such as the non-edible parts.

"Atmospheric pressure" refers to the normal air pressure, e.g. 760 mm Hg or 101325 Pa at sea level. This term is also meant to encompass pressures that are between about +15 and −15% of atmospheric pressure, preferably between about +10% and −10% more preferably between about +5% and −5%.

As mentioned above, the present invention provides a method for the production of a solid molded article comprising non-wood plant material, the method comprising the steps of (a) providing one or more fresh non-wood plant material having a moisture content from 20 w/w to 99% w/w; (b) heating the fresh non-wood plant material at a temperature from 40° C. to 250° C., in particular, at a temperature from 60° C. to 140° C., and a pressure from 40 KPa to 750 KPa, in particular, for at least 0.5 h, maintaining the moisture content of the material equal to or higher than 20% w/w; (c) molding the heated material obtained in step (b); and (d) drying the molded material obtained in step (c).

Particularly, the non-wood plant material is the whole or any part of a non-wood plant, or a non-wood part of a wood plant.

Particularly, the fresh non-wood plant material is a non-wood plant material that after harvesting has not been preserved by drying.

The method of the invention takes advantage of the natural moisture content of non-wood plant materials which allows the separation of cellulose fibers through the degradation of intercellular pectins by wet heating, thereby generating a moldable material that can be further processed into articles by simple shaping and drying.

As shown in the examples below, the inventors found that in order to obtain products with the desired properties following the simple method herein provided, the starting plant material has to be fresh, i.e. it cannot be plant material that has been dried and rehydrated. Also importantly, the plant material has to be herbaceous (i.e. non-wood) and it has to contain a natural moisture content (i.e. the moisture content at harvesting) above a certain value.

The inventors surprisingly found that in order to obtain solid molded articles with characteristics suitable for industry, plant materials with a minimum natural moisture content had to be used. Importantly, these characteristics were not achieved when non-wood plant materials were dried and dehydrated before subjecting them to the heat treatment. However, once they had been subjected to the heat treatment of the invention, they could be reutilized or reprocessed through rehydration, molding and drying cycles an indefinite number of times. Maintaining the moisture content of the material equal to or higher than 20% w/w during the heating step means that at the end of step (b) the moisture content of the heated material is equal to or higher than 20% w/w.

In a particular embodiment, optionally in combination with any of the embodiments provided above or below, the method of the first aspect is for the production of a solid molded article comprising non-wood plant material, the method comprising the steps of (a) providing one or more fresh non-wood plant material having a moisture content from 20% w/w to 99% w/w; (b) heating the fresh non-wood plant material at a temperature from 40° C. to 250° C., in particular, at a temperature from 60° C. to 140° C. and a pressure from 40 KPa to 750 KPa, in particular for at least 0.5 h, maintaining the moisture content of the material equal to or higher than 20% w/w; (c) molding the heated material obtained in step (b); and (d) drying the molded material of step (c).

In a particular embodiment, optionally in combination with any of the embodiments provided above or below, in the method of the first aspect, the solid molded article made of non-wood plant material has a porosity determined by mercury intrusion porosimetry in a range of from 5% to 90%.

In a particular embodiment, optionally in combination with any of the embodiments provided above or below, in the method of the first aspect, the solid molded article made of non-wood plant material has a density determined by using a pycnometer in a range of from 25 $kg/m^3$ to 2000 $kg/m^3$. More in particular, from 100 $kg/m^3$ to 2000 $kg/m^3$. Even more in particular, from 250 $kg/m^3$ to 2000 $kg/m^3$.

Density measurement with a pycnometer may be carried out using a 37 cc pycnometer and a high precision scale (1 mg resolution) in order to achieve a density resolution of 1 $mg/cm^3$. The method is based on the weight difference between 37 cc of distilled water and 37 cc of distilled water with the sample immersed on it. Regarding the relation to porosity, this method works better in low porosity samples because water occupies more volume than the preferable in the low-density samples. This implies that density in these high porosity (low density) samples will be overvalued. Thus, in this case density values may be measured utilizing dimensions and weight.

In a particular embodiment, optionally in combination with any of the embodiments provided above or below, in the method of the first aspect, the solid molded article made of non-wood plant material has a strength determined using a nanoindenter in a range of from 6 MPa to 250 MPa.

Nanoindentation experiments measure the material mechanical properties by measuring the response of the material under the stress produced by a calibrated tip. Material strength may be measured using a Agilent Nano Indenter G200 that works under the ISO 14577, through a basic automatic load experiment for measuring hardness and Young modulus. Measurements may be made at 10 different places to get an overall value and reduce the local dependence.

In a particular embodiment, optionally in combination with any of the embodiments provided above or below, in the method of the first aspect, the solid molded article made of non-wood plant material has an elasticity determined using a nanoindenter in a range of from 50 MPa to 7 GPa.

In a particular embodiment, optionally in combination with any of the embodiments provided above or below, the solid molded article has a thermal conductance determined in a thermal testing machine (like FOX 600GHP by TAinstruments) (ISO8302/ISO22007) in a range of from 0.01 W/mK to 0.15 W/mK.

In a particular embodiment, optionally in combination with any of the embodiments provided above or below, the solid molded article has a flexural strength determined by a three-point flexural test in a range of from 10 MPa to 150 MPa.

In a particular embodiment, optionally in combination with any of the embodiments provided above or below, the solid molded article has an ultimate tensile strength determined using a tensile-strength tester (like Mega1500 by Labthink) in a range of from 10 MPa to 500 MPa.

In a particular embodiment, optionally in combination with any of the embodiments provided above or below, the step (b) is carried out without the addition of water.

In a particular embodiment, optionally in combination with any of the embodiments provided above or below, the step (b) is carried out in a hermetic vessel.

In a particular embodiment, optionally in combination with any of the embodiments provided above or below, the non-wood plant material after the heating step (b) has one or more of:

i) a moisture content in a range of from 20% to 99%:
ii) a dewatering value determined by the Schopper-Riegler method in a range of from 20° SR to 100° SR; and
iii) a viscosity determined by Brookfield method in a range of from 0.001 Pa·s to 15 Pa·s.

The Schopper-Riegler method may be carried out as the UNE-EN ISO 5267-1:2001 defines. Recovering 2 gr of dry mass at the end of the experiment.

In a particular embodiment, optionally in combination with any of the embodiments provided above or below, the moisture content of the fresh non-wood plant material of step (a) is in a range of from 25% w/w to 99% w/w, from 30% w/w to 99% w/w, from 35 w/w to 99% w/w, from 40% w/w to 99% w/w, from 45% w/w to 99% w/w, from 50 w/w to 99% w/w, from 55% w/w to 99% w/w, from 60% w/w to 99% w/w, from 65 w/w to 99% w/w, from 70% w/w to 99% w/w, from 75% w/w to 99% w/w, or from 80 w/w to 99% w/w.

In a particular embodiment, optionally in combination with any of the embodiments provided above or below, the one or more fresh non-wood plant material of step (a) has a lignin content lower than or equal to 20% w/w; lower than or equal to 18% w/w, lower than or equal to 16% w/w, lower than or equal to 14% w/w, lower than or equal to 12 w/w, or lower than or equal to 8% w/w. In a more particular embodiment, the one or more fresh non-wood plant material of step (a) has a lignin content lower than or equal to 20 w/w.

In a particular embodiment, optionally in combination with any of the embodiments provided above or below, the fresh non-wood plant material of step (a) is an agricultural product or by-product. The method of the invention can be preferentially carried out with the non-edible parts of agricultural products, which are commonly discarded.

In a particular embodiment, optionally in combination with any of the embodiments provided above or below, the fresh non-wood plant material of step (a) is from a non-wood plant.

In a particular embodiment, optionally in combination with any of the embodiments provided above or below, the fresh non-wood plant material of step (a) comprises a whole plant, a stem, a branch, a leaf, a root, a fruit, or combinations thereof.

In a particular embodiment, optionally in combination with any of the embodiments provided above or below, the fresh non-wood plant material of step (a) is from a vegetable. Vegetables, in particular their non-edible parts, are especially useful for producing solid molded articles according to the method of the invention.

In a particular embodiment, optionally in combination with any of the embodiments provided above or below, the fresh non-wood plant material of step (a) is from a plant that belongs to a group selected from bryophytes, angiosperms and non-wood gymnosperms.

In a particular embodiment, optionally in combination with any of the embodiments provided above or below, the fresh non-wood plant material is from a plant selected from the group consisting of artichoke, alfalfa, garlic, eggplant, broccoli, zucchini, pumpkin, hemp, onion, cauliflower, strawberry, chickpea, peas, bean, green bean, lentils, linen, corn, melon, turnip, potato, cucumber, peppers, radish, beetroot, watermelon, tomato, carrot, chard, artichoke, leek, celery, borage, canons, thistle, cabbage, endive, asparagus, spinach, turnip tops, lettuce, leek, arugula, soy, and mixtures thereof. The part of the plant used for the method of the invention will depend on the desired properties of the solid molded object to be produced. For example, whole lettuce promotes a lower density product compared to process lettuce without roots.

in a particular embodiment, optionally in combination with any of the embodiments provided above or below, the fresh non-wood plant material of step (a) is selected from the group consisting artichoke flower, cabbage plant, coconut husk, celery plant, lettuce, apples, pineapple, almond, apple, apricot, banana, blackberry, blueberry, cherry, chestnut, coconut, date, grape, hazelnut, lemon, lime, mango, melon, morello cherry, orange, peach, peanut, pear, pineapple, plum, raspberry, strawberry, tangerine, watermelon, aubergine, asparagus, beans, beetroot, broccoli, brussels, sprouts, cabbage, carrot, cauliflower, corn, courgette, cucumber, eggplant, garlic, leek, lentils, mushroom, onion, peas, pepper, pickle, potato, pumpkin, radish, rice, rye, spinach, squash, tomato, turnip, watercress, chard, garlic, watercress, borage, zucchini, thistle, onion, mushroom, brussels sprout, escarole, endive, asparagus, spinach, green bean, lombarda, palmitos, cucumber, leek, radish, beet, soy, brune, avocado, apricot, blueberry, cherry, custard, apple, coconut, peach, strawberry, pomegranate, passion fruit, currant, blackcurrant, soursop, guava, figs, kiwi, lemon, litchi, lulo, tangerine, mango, passion fruit, peach, cantaloupe, quince, blackberry, orange, nectarine, medlar, papaya, Paraguayan, pitaya whistle, tamarind, grape, sapodilla, alfalfa, carob, oatmeal, barley, pea, corn, millet, chard, thistle, endive and mixtures thereof.

In a particular embodiment, optionally in combination with any of the embodiments provided above or below, the step (b) is performed at a temperature from 40° C. to 250° C., from 50° C. to 225° C., from 60° C. to 200° C., from 60° C. to 150° C., from 70° C. to 140° C., from 80° C. to 130° C., from 90° C. to 120° C., or from 95° C. to 110° C. More in particular, the step (b) is performed at a temperature from 70° C. to 120° C. Even more in particular, the step (b) is performed at a temperature from 60° C. to 140° C. And even more in particular, the step (b) is performed at a temperature of about 100° C.

The term "about" or "around" as used herein refers to a range of values ±10% of a specified value. For example, the expression "about 10" or "around 10" includes ±10% of 10, i.e. from 9 to 11.

In a particular embodiment, optionally in combination with any of the embodiments provided above or below, the fresh non-wood plant material consists of artichoke flowers with a moisture content around 70-80% w/w and the heating step is performed at a temperature from 80° C. to 100° C.

In a particular embodiment, optionally in combination with any of the embodiments provided above or below, the fresh non-wood plant material consists of cabbage plant wherein the roots have been removed, with a moisture content around 85-95% w/w and the heating step is performed at a temperature from 60° C. to 100° C.

In a particular embodiment, optionally in combination with any of the embodiments provided above or below, the fresh non-wood plant material consists of lettuce whole plant without the roots, with a moisture content around 85-95% w/w and the heating step is performed at a temperature from 40° C. to 250° C., in particular, at a temperature from 60° C. to 140° C. and for at least 0.5 h.

In a particular embodiment, optionally in combination with any of the embodiments provided above or below, the fresh non-wood plant material consists of coconut husk with a moisture content around 80-90% w/w and the heating step is performed at a temperature of 100° C.

In a particular embodiment, optionally in combination with any of the embodiments provided above or below, the fresh non-wood plant material consists of pineapple leaves with a moisture content around 85-95% w/w and the heating step is performed at a temperature from 80° C. to 100° C.

In a particular embodiment, optionally in combination with any of the embodiments provided above or below, the fresh non-wood plant material consists of celery plant with a moisture content around 90-99% w/w and the heating step is performed at a temperature from 60° C. to 100° C.

In a particular embodiment, optionally in combination with any of the embodiments provided above or below, the plant material consists of cauliflower flowers with a moisture content around 90-99% w/w and the heating step is performed at a temperature from 60° C. to 100° C.

In a particular embodiment, optionally in combination with any of the embodiments provided above or below, the solid molded article made of non-wood plant material has a density determined using a pycnometer in a range of from 50 kg/m$^3$ to 1200 kg/m$^3$ and the method comprises the steps of:

(a) providing fresh artichoke flowers having a moisture content from 20% w/w to 99% w/w;
(b) heating the fresh artichoke flower at a temperature from 70° C. to 150° C. and a pressure from 40 KPa to 750 KPa, maintaining the moisture content of the artichoke flower equal to or higher than 20% w/w;
(c) molding the heated material obtained in step (b); and
(d) drying the molded material of step (c).

In a particular embodiment, optionally in combination with any of the embodiments provided above or below, the solid molded article made of non-wood plant material has a strength determined using a nanoindenter in a range of from 6 MPa to 250 MPa and the method comprises the steps of:

(a) providing fresh cabbage plant without roots, having a moisture content from 30% w/w to 99% w/w;
(b) heating the fresh cabbage plant at a temperature from 70° C. to 150° C. and a pressure from 40 KPa to 750 KPa, maintaining the moisture content of the cabbage plant equal to or higher than 20% w/w;
(c) molding the heated material obtained in step (b); and
(d) drying the molded material of step (c).

In a particular embodiment, optionally in combination with any of the embodiments provided above or below, the solid molded article made of non-wood plant material has a thermal conductivity determined in a thermal testing infrastructure in a range of from 0.01 W/mK to 0.15 W/mK. and the method comprises the steps of:

(a) providing fresh coconut husk having a moisture content from 65% w/w to 99% w/w;
(b) heating the fresh coconut husk at a temperature from 70° C. to 150° C. and a pressure from 40 KPa to 750 KPa, maintaining the moisture content of the coconut husk equal to or higher than 20% w/w;
(c) molding the heated material obtained in step (b); and
(d) drying the molded material of step (c).

In a particular embodiment, optionally in combination with any of the embodiments provided above or below, the solid molded article made of non-wood plant material has a density determined by using a pycnometer in a range of from 50 kg/m$^3$ to 500 kg/m$^3$. and the method comprises the steps of:

(a) providing fresh pineapple leaves having a moisture content from 65% w/w to 99 w/w;
(b) heating the fresh pineapple leaves at a temperature from 70° C. to 110° C. and a pressure from 40 KPa to 750 KPa, maintaining the moisture content of the pineapple leaves equal to or higher than 30% w/w;
(c) molding the heated material obtained in step (b); and
(d) drying the molded material of step (c).

In a particular embodiment, optionally in combination with any of the embodiments provided above or below, the solid molded article made of non-wood plant material has a strength determined using a nanoindenter in a range of from 6 MPa to 250 MPa, a flexural strength (measured by a three point test) in a range of from 10 MPa to 150 MPa, and the method comprises the steps of:

(a) providing fresh celery plant having a moisture content from 65% w/w to 99% w/w;
(b) heating the fresh celery plant at a temperature from 70° C. to 150° C. and a pressure from 40 KPa to 750 KPa, maintaining the moisture content of the celery plant equal to or higher than 30% w/w;

(c) molding the heated material obtained in step (b); and
(d) drying the molded material of step (c).

In a particular embodiment, optionally in combination with any of the embodiments provided above or below, the solid molded article made of non-wood plant material has a strength determined using a nanoindenter in a range of from 70 MPa to 150 MPa and the method comprises the steps of:

(a) providing fresh cauliflower flowers having a moisture content from 65% w/w to 99 w/w;
(b) heating the fresh cauliflower flower at a temperature from 70° C. to 150° C. and a pressure from 40 KPa to 750 KPa, maintaining the moisture content of the cauliflower flower equal to or higher than 20% w/w;
(c) molding the heated material obtained in step (b); and
(d) drying the molded material of step (c).

In a particular embodiment, optionally in combination with any of the embodiments provided above or below, the solid molded article made of non-wood plant material has an elasticity determined using a nanoindenter in a range of from 500 MPa to 2 GPa and the method comprises the steps of:

(a) providing fresh lettuce plants having a moisture content from 65% w/w to 99% w/w;
(b) heating the fresh lettuce plant at a temperature from 70° C. to 150° C. and a pressure from 40 KPa to 150 KPa, maintaining the moisture content of the lettuce plants equal to or higher than 30% w/w;
(c) molding the heated material obtained in step (b); and
(d) drying the molded material of step (c).

The skilled in the art would understand that the temperature and time of the step (b) has to be adjusted in view of the characteristics of the fresh non-wood plant material, such as its moisture content, fiber content, pectin content, etc. One way to know when the heat treatment has been producing the desired effect on the plant material is to observe the loss of mechanical consistency that occurs when pectins get degraded, or the change in color that occurs when the chlorophyll gets degraded, switching the intense green colors into dark green colors. This can be done by visual inspection.

Thus, in a particular embodiment, optionally in combination with any of the embodiments provided above or below, the heating step is performed until the molecular structure of the fresh plant material is substantially altered. In another a particular embodiment, the heating step is performed until the color of the fresh plant material is substantially changed. In a more particular embodiment, the heating step is performed for a period of time from 3 min to 7 h. In an even more particular embodiment, for a period of time from 0.5 h to 7 h, from 0.5 h to 6 h, from 0.5 h to 5 h, from 0.5 h to 4 h, or from 0.5 h to 3 h.

In a more particular embodiment, optionally in combination with any of the embodiments provided above or below, the heating step is performed for at least 0.5 h, for at least 1 h, for at least 1.5 h, for at least 2 h, or for at least 2.5 h.

In a more particular embodiment, the heating step is performed for a period of time from 0.5 h to 7 h, from 0.5 h to 6 h, from 0.5 h to 5 h, from 0.5 h to 4 h, or from 1 h to 4 h, after the thermalization of the fresh plant material is achieved. This means that the material has to be heated for the indicated periods of time after all its mass has reached the desired temperature. Thermalization of the fresh plant material refers to the time point in which all its mass has reached the desired temperature.

In a particular embodiment, optionally in combination with any of the embodiments provided above or below, the heating step is ended before the thermalization of the fresh plant material is achieved thereby obtaining a mixture of transformed and raw material. In a more particular embodiment, the heating step is performed for a period of time from 3 min to 0.5 h, from 5 min to 0.5 h, from 10 min to 0.5 h, or from 15 min to 0.5 h, such that the heating step is ended before the thermalization of the mass occurs.

The method of the invention has the advantage of not requiring high pressures in the heating step or the molding step. Therefore, in a particular embodiment, the step (b), step (c), and/or step (d) of the method are performed at atmospheric pressure.

In a particular embodiment, optionally in combination with any of the embodiments provided above or below, the pressure of the heating step in in a range of from 40 KPa to 750 KPa, from 50 KPa to 600 KPa, from 60 KPa to 450 KPa, from 70 KPa to 300 KPa, from 80 KPa to 200 KPa, from 90 KPa to 150 KPa, or from 95 KPa to 130 KPa.

Thus, the heating step of the method can also be carried out in hermetic vessels in order to avoid the drying of the solid molded articles.

In a particular embodiment, optionally in combination with any of the embodiments provided above or below, the heating step is performed maintaining the moisture content of the material equal to or higher than 20% w/w, equal to or higher than 25% w/w, equal to or higher than 30% w/w, equal to or higher than 35% w/w, equal to or higher than 40% w/w, equal to or higher than 45% w/w, equal to or higher than 50% w/w, equal to or higher than 55% w/w, equal to or higher than 60% w/w, or equal to or higher than 65% w/w.

The inventors have found that depending on the heating method used, additional water could be added to the plant material to avoid drying and increase energetic efficiency.

In a particular embodiment, optionally in combination with any of the embodiments provided above or below, the heating of step is performed by baking, microwaving, or boiling (preferably in the presence of water) the plant material.

In a particular embodiment, optionally in combination with any of the embodiments provided above or below, the molding step is performed with a heated material that has a moisture content equal to or higher than 20% w/w, 30% w/w, 40% w/w, 50% w/w, or 60% w/w.

In a particular embodiment, optionally in combination with any of the embodiments provided above or below, the drying step is performed until the moisture content of the molded material is reduced to a value equal to or lower than 25% w/w, 20% w/w 15 w/w, 10% w/w, or 5% w/w. Any drying method can be used to reduce the moisture content of the molded material, such as compression, extrusion, filtration, absorption, vacuum drying, blow-drying, heating, radiation, patting, vaporization under blower and other methods of desiccation, including natural air drying.

In a particular embodiment, optionally in combination with any of the embodiments provided above or below, the method further comprises a cutting step before the heating step or after the heating step and before the molding step. The use of non-wood fresh materials in the method of the invention does not require energetically demanding steps, such as mechanical grinding or vapor explosion, to cut the material. Moreover, if the cutting of the material is carried out after step (b), a simple manual shredding is enough before subjecting the material to the molding process. Thus, in a more particular embodiment, the cutting is selected from the group consisting of chopping, breaking, shredding, and combinations thereof. In an even more particular embodiment, the cutting of the plant material produces particles of an average size from 0.025 cm to 5 cm, from 0.05 cm to 4 cm, from 0.075 cm to 3 cm, or from 0.1 cm to 2.5 cm.

By cutting the material, the size of the fibers is reduced. Shorter fibers allow the production of more compact, rigid and strong molded articles. On the contrary, longer fibers allow the production of lighter and more flexible molded articles. Moreover, various fresh non-wood plant materials can be mixed in order to obtain molded articles with the desired characteristics.

In a particular embodiment, optionally in combination with any of the embodiments provided above or below, the method further comprises after step (b) and before step (c) the step of mixing the heated non-wood plant material with wood plant material. As shown in the examples below, the inventors have found that by mixing the heated non-wood plant material with wood material allows modifying the final characteristics of the solid molded articles produced. If the method also comprises a cutting step after step (b), the mixing step is carried out after the cutting step.

In a particular embodiment, optionally in combination with any of the embodiments provided above or below, the method further comprises after step (b) and before step (c) the step of mixing the heated non-wood plant material with cellulose from wood plants origin.

In a particular embodiment, optionally in combination with any of the embodiments provided above or below, the method further comprises a pre-drying step after step (c) and before step (d) wherein the moisture content of the molded material is reduced to a value equal to or lower than 35% w/w, 30% w/w, 25% w/w, 20% w/w, 15% w/w, or 10 w/w. This pre-drying step can be carried out with any standard technique known by the skilled in the art, such as centrifuging.

The material obtained in step (b) of the method of the invention can be molded into products with a wide range of shapes, forms, and designs. Said products can be produced by direct shaping methods like casting, compression molding, injection molding, laminating, matrix molding, 3D printing or extruding.

Thus, in a particular embodiment, optionally in combination with any of the embodiments provided above or below, the step (c) is carried out by a method selected from the group consisting of casting, molding, extruding, and combinations thereof.

The solid molded articles produced by the method of the invention can be further improved by the addition of specific modifiers and/or additives. For instance, the resistance of the products against moisture or water, chemically aggressive environments, degradation by microorganisms (e.g. bacteria, fungi), xylophagous insects, and/or fire, can be improved by adding particular additives to the material during the method. Other characteristics of the products can be modified, such as their color, smell, conductivity, or mechanical properties, by the addition of particular modifiers. The skilled in the art would know which additive should be added depending on the characteristic of the solid molded article to be altered, and in which step of the method to add it, for example, a dye could be added after the heat treatment but before the molding, and a varnish could be applied after the drying step. The additives that can be used in the method of the invention include, without limitation, ecological glue, chemical compounds (e.g. Calcium chloride, Sodium silicate, Hydrogen peroxide and others) and waxes.

In a particular embodiment, optionally in combination with any of the embodiments provided above or below, the method further comprises a step of mixing the fresh non-wood plant material with one or more additives.

In a particular embodiment, optionally in combination with any of the embodiments provided above or below, the method further comprises a step of mixing the fresh non-wood plant material with flocculants, coagulants or chelatants to improve dewatering processes.

Additionally, the molded articles of the invention can be further improved by physical or chemical treatments, such as heat treatment. Thus, in a particular embodiment, optionally in combination with any of the embodiments provided above or below, the method further comprises a second heating step after step (d) at a temperature from 100° C. to 250° C. with controlled atmosphere, to increase water resistance.

It is desirable to use additives that occur naturally, or which are derived directly from naturally occurring materials, and/or that are biodegradable (e.g. into carbon dioxide, water and, possibly, biomass) in composting or in other biological waste management processes.

In a particular embodiment, optionally in combination with any of the embodiments provided above or below, the method further comprises one or more times reprocessing the solid molded article comprising non-wood plant material to obtain a reprocessed solid molded article by a process which comprises the following steps after the drying step (d):

(e) rehydrating the solid molded article and obtaining a rehydrated material;
(f) molding the rehydrated material obtained in step (e); and
(g) drying the molded material of step (f).

In a particular embodiment, optionally in combination with any of the embodiments provided above or below, the rehydrating step (e) is performed by adding water until the weight of the rehydrated object is three times the weight of the object before rehydration. In other words, the rehydrating step comprises adding water in a proportion higher than or equal to 3:1 (water:object dry mass).

One of the main advantages of the method of the invention is that it produces solid molded articles that can be subjected to the cycle of rehydration-molding-drying an indefinite number of times. Therefore, the solid molded articles generated are not only biodegradable but also reusable.

As mentioned above, in a second aspect, the invention provides a solid molded article obtainable by the process as defined in the first aspect.

The solid molded article "obtainable by" the method as defined above is used herein to define the solid molded article by its preparation process and relates to the solid molded article obtainable by the preparation method which comprises the steps a), b), c) and d) described above. For the purposes of the invention, the expressions "obtainable", "obtained" and equivalent expressions are interchangeably used, and in any case the expression "obtainable" includes the expression "obtained".

The embodiments mentioned above with regard to the method of the first aspect also apply to the solid molded article obtainable by its preparation process.

Thus, it has been surprisingly found that products with completely different characteristics—for example, materials characterized by a high stiffness or materials having a high elasticity—may be produced from various non-wood plant materials by using the method of the invention, even in the absence of conventional, synthetic chemical cross-linking agents and/or conventional, synthetic chemical plasticizing agents. Hence, for example, by changing the mixture of raw materials and by introducing different processing steps different products with different characteristics may be developed, which exhibit good application performance. Thus, it is possible to manufacture products according to the present invention that differ in strength, elasticity and stiffness; products that differ in shape and/or density; products that differ with regard to their biodegradability—or composability; products that exhibit barrier properties with regard to oxygen and other gases, ranging from permeable materials to materials having good barrier properties; products that differ in their barrier properties with respect to heat, including materials having good heat-resistance; and products that vary with regard to their resistance to organic solvents, oils, water and the like.

The products of the present invention, depending upon their final properties, may find application in various industries—they may, of course, be used in combination with other materials. For example, they may find use:

- as constructional materials in the building and construction industries, as well as in the furniture and cabinet-making industries, e.g. in the form of particle board, MDF (medium density fiberboard) or HDF (high density fiberboard);
- as bulk thermoplastic products, such as disposables, sheets, foils, webs, laminates and films, for instance,
- for agricultural uses (which expression herein includes horticultural uses);
- as backing materials in floor coverings, such as carpets or carpet tiles;
- as roofing materials;
- as constructional materials for use in road building and the like;
- as insulation materials, for thermal, electrical and noise insulation purposes;
- as packaging materials such as, for example, bottles, snack-packs, crates, containers and the like;
- as cushion materials for protection purposes,
- as decorative items, e.g. desktops, plaques, store fixtures, wall tiles and the like;
- as extruded granulates for use as a raw material in, for instance, household materials, toys and the like; and In a particular embodiment of the second aspect, optionally in combination with any of the embodiments provided above or below, the solid molded article has a density determined using a pycnometer in a range of from 25 kg/m$^3$ to 2000 kg/m$^3$.

In a particular embodiment of the second aspect, optionally in combination with any of the embodiments provided above or below, the solid molded article has an elasticity determined using a nanoindenter in a range of from 50 MPa to 7 GPa.

In a particular embodiment of the second aspect, optionally in combination with any of the embodiments provided above or below, the solid molded article has a strength determined using a nanoindenter in a range of from 6 MPa to 250 MPa.

In a particular embodiment of the second aspect, optionally in combination with any of the embodiments provided above or below, the solid molded article has a dewatering value determined by the Schopper-Riegler method in a range of from 20° SR to 100° SR.

In a particular embodiment of the second aspect, optionally in combination with any of the embodiments provided above or below, the solid molded article has a porosity determined by mercury intrusion porosimetry in a range of from 5% to 90%.

In a particular embodiment of the second aspect, optionally in combination with any of the embodiments provided above or below, the solid molded article has a thermal conductance determined in a thermal testing machine (like FOX 600GHP by TAinstruments) (ISO08302/ISO22007) in a range of from 0.01 W/mK to 0.15 W/mK.

In a particular embodiment of the second aspect, optionally in combination with any of the embodiments provided above or below, the solid molded article has a flexural strength (measured by a three point test) in a range of from 10 MPa to 150 MPa.

In a particular embodiment of the second aspect, optionally in combination with any of the embodiments provided above or below, the solid molded article has an ultimate tensile strength in a tensile-strength tester (like Mega1500 by Labthink) in a range of from 10 MPa to 500 MPa.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

Example 1—Molded Article from Artichoke Flowers

Fresh artichoke flowers (waste discarded from food preparation) with a moisture content around 72% w/w were cut into pieces under 1 cm size, then heated at temperature of 100° C. for 90 min with electric resistance 800 W submerged in water. The resulting mass was crumbled with 300 W blender and centrifuged at 1000 rpm to get a moldable mass. This mass was placed into a recipient with the desired final shape and then dried in the sun for a week. The resulting article was solid and presented a moisture content of 17% (Velleman Contact hygrometer model DVM125) a density of 568 kg/m$^3$ (Pycnometer).

Example 2—Molded Object from Cabbage

Fresh red cabbage with a moisture content around 93% w/w was heated at temperature of 100° C. for 35 min with a microwave oven power 900 W. Then, it was crumbled with 300 W blender and placed into a metallic recipient with the desired final shape. It was then dried for 6 hours at 100° C. in a convection oven. The resulting article was solid and presented a density of 1359 kg/m$^3$ (Pycnometer).

Example 3—Thermal Isolating Properties for Low-Density Materials Produced According to the Method of the Invention Fibers from the cover of the edible part of the coconut husk with a moisture content around 80% w/w were heated at temperature of 100° C. during 90 min with electric resistance 800 W submerged in water. They were then crumbled with 300 W blender and placed in a porous mold and pressed to remove excess water. The molded mass was dried in the sun until the moisture content reached his minimum value (~14%). The resulting article was solid and presented a moisture content of 12% w/w (Velleman Contact hygrometer model DVM125) a density of 114.8 $kg/m^3$ (weight/dimensions) a thermal transmittance of 0.472 $W/m^2K$, a thermal Resistance of 2.119 $m^2K/W$, and a thermal conductivity: 0.019 W/mK.

Example 4—Mechanical Testing for High Hardness Articles Produced with the Method of the Invention Fresh celery with a moisture content around 95% was heated at temperature of 100° C. for 90 min with electric resistance 800 W submerged in water and then crumbled with 300 W blender. The mass was later placed in a porous mold with the desired shape and pressed to remove excess water. The molded mass was dried in the sun until its moisture content reached a minimum value of approximately 11% w/w. The resulting article was and presented a density of 1029 $kg/m^3$ (Pycnometer), a Vickers hardness of 11.6 HV (114 MPa) (measured with a Vickers durometer MXT70 Matsuzawa), a Brinell hardness of 20.4 HB (measured with a Rockwell durometer), a flexural strength of 76.21 MPa (measured by a three point test), and an ultimate tensile strength of 29 MPa.

Example 5—Physical Properties of Wet Mass and High Hardness Articles Produced with the Method of the Invention Fresh celery (whole plant) with a moisture content of around 95% was heated at a temperature of 100° C. during 90 min with electric resistance 800 W submerged in water and then crumbled with a 300 W blender. The resulting mass was later centrifuged at 1400 rpm, molded and dried on a microwave oven. The final molded article was solid and presented a moisture content of 10.6% (Measured as stated at UNE-EN ISO 638:2009). After that a wet mass portion was prepared (as stated at UNE EN-ISO 5263-1). The wet mass presented a:

Dewatering value of 88±1.4° SR (According UNE-EN ISO 5267-1:2001) (measured by Schopper-Riegler dewatering test).

Viscosity: 135±5 centipoise (Brookfield test, using a RV2 spindle@100 rpm at 25° C.).

Rugosity: 6.231±0.984 μm (Sensofar confocal microscope)

Porosity: (Mercury intrusion porosimeter)

| | | |
|---|---|---|
| Total intrusion volume | 0.5442 | mL/g |
| Total pore area | 7.488 | $m^2/g$ |
| Pore diameter (volume) (median) | 3.04451 | μm |
| Pore diameter (area) (median) | 0.00943 | μm |
| Median pore diameter | 0.29072 | μm |
| Aparent density | 0.8248 | g/mL |
| Aparent density (skeletal) | 1.4964 | g/mL |
| Porosity | 44.89% | |

Example 6—Molded Article from a Briophyte

Fresh moss with a moisture content around 96% w/w was heated at 100° C. during 120 min, then placed into a metallic recipient with the desired final shape and dried for 6 hours at 50° C. on desiccator. The resulting article was solid and presented a good consistency and low hardness.

Example 7 (Comparative Example)—Molded Articles from Lettuce Processed at Different Temperatures Fresh whole lettuce with a moisture content of 96% w/w was heated at the indicated temperatures [(a) 30° C., (b) 40° C., (c) 60° C., (d) 70° C., (e) 80° C., (f) 100° C.], during 1 hour and submerged in water using Klarstein pot (model 10031629). It was then crumbled with 500 W Sammic blender (model TR-550BXL) and centrifuged at 1400 rpm for 14 minutes. The resulting mass was molded manually to get a disc shape and dried for 24 hours at 50° C. on a desiccator. The resulting disc was solid and presented a moisture content of 13% (Velleman Contact hygrometer model DVM125). The elasticity modulus, hardness (Agilent Nanoindenter model G200) and density (pycnometer) obtained at the indicated temperatures are shown in the table below:

| Temperature (° C.) | Elasticity (MPa) | Hardness (MPa) | Density ($kg/m^3$) |
|---|---|---|---|
| (a) 30 | — | — | — |
| (b) 40 | 158 | 10 | 641 |
| (c) 60 | 102 | 14 | 741 |
| (d) 70 | 1723 | 159 | 811 |
| (e) 80 | — | — | 900 |
| (f) 100 | 4288 | 145 | 1072 |

The article produced by the method (a) at 30° C. did not present characteristics suitable for its use in industry.

Example 8—Lettuce Processed at Different Temperatures

Fresh lettuce (whole plant) with a moisture content of about 96% w/w was heated at temperature of (a) 150° C. of (b) 250° C. for 60 minutes enclosed in hermetic recipient and placed in commercial convection oven. It was then crumbled with 500 W Sammic blender model TR-550BXL and centrifuged at 1400 rpm and molded manually to get a disc shape. The disc was dried for 24 hours at 50° C. on desiccator. The resulting solid article presented a moisture content of 14% (Velleman Contact hygrometer model DVM125). The values of elasticity modulus and hardness (Agilent Nanoindenter model G200), and density (pycnometer) of the resulting articles are shown in the table below:

| Temperature (° C.) | Elasticity (MPa) | Hardness (MPa) | Density ($kg/m^3$) |
|---|---|---|---|
| (a) 150 | 1464 | 110 | 852 |
| (b) 250 | 1167 | 124 | 700 |

Example 9—Molded Articles from Artichoke Processed at Different Temperatures Fresh artichoke (whole plant) with a moisture content of around 72% w/w was heated at (a) 60° C. or (b) 100° C. for 60 min submerged in water using Klarstein (pot model 10031629). It was then crumbled with 500 W Sammic blender (model TR-550BXL), centrifuged at 1400 rpm, molded manually to get a disc shape, and dried for 24 hours at 50° C. on desiccator. The resulting article was solid an presented a humidity of 10% (Velleman Contact hygrometer model DVM125) and the following densities measured with a pycnometer:

| Temperature (° C.) | Density (kg/m$^3$) |
|---|---|
| (a) 60 | 715 |
| (b) 100 | 708 |

Example 10—Molded Article from Artichoke

Fresh artichoke (whole plant) with a moisture content of around 72% w/w was heated at (a) 60° C. or (b) 100° C. for 60 min submerged in water using Klarstein (pot model 10031629). It was then crumbled with 500 W Sammic blender (model TR-550BXL), centrifuged at 1400 rpm, filtered using sieve extract to obtain (a) fibers with less 1 mm size (b) fibers with size over 1 mm (c) washed fibers with size over 1 mm. The resulting mass was molded manually to get a disc shape which was dried for 24 hours at 50° C. on desiccator. The resulting articles were solid and presented a moisture content of 12% (Velleman Contact hygrometer model DVM125) and the following densities (measured using pycnometer; example c density value under parenthesis measured by weight/dimensions):

| Fiber size | Density (kg/m$^3$) |
|---|---|
| (a) Less 1 mm | 1103 |
| (c) Over 1 mm | 694 |
| (c) Washed | 553 (88) |

Example 11—Molded Article from Non-Wood (NW) Material Mixed with Wood (W) Material Additive (Cellulose)

Fresh whole lettuce with a moisture content of 96% w/w was heated at 100° C. during 60 minutes and submerged in water using Klarstein pot (model 10031629). It was then crumbled with 500 W Sammic blender (model TR-550BXL) and centrifuged at 1400 rpm for 14 minutes. Then cellulose powder (obtained from wood) was added and mixed until a homogenous mass was obtained. The mass was molded manually to get a disc shape and dried for 24 hours at 50° C. on desiccator. The final solid articles produced with the indicated ratios of non-wood material (NW) and wood material (N) presented a moisture content of 14% (Velleman Contact hygrometer model DVM125) and the following densities (measured using pycnometer) and values of elasticity modulus and hardness (measured Agilent Nanoindenter model G200):

| Weigth % | Elasticity (MPa) | Hardness (MPa) | Density (kg/m$^3$) |
|---|---|---|---|
| (a) 100% NW | 4288 | 145 | 1072 |
| (b) 50% NW/50% W | 1020 | 81 | 680 |
| (c) 25% NW/75% W | 180 | 6 | 637 |

Example 12—Modifying Molded Article Density Through a Filtering Step

A fresh lettuce stem with a moisture content of around 96% w/w was heated at 100° C. during 240 min submerged in water using Klarstein pot (model 10031629). It was then crumbled with 500 W Sammic blender (model TR-550BXL), centrifuged at 1400 rpm, filtered using sieve to get material (a) size below 1 mm (b) non filtered (c) size over 1 mm (d) Size over 1 mm and washed generously with water. The material was then molded manually to get a disc shape and dried for 24 hours at 50° C. on desiccator. The resulting solid articles presented a moisture content of 14% (Velleman Contact hygrometer model DVM125) and the following densities (measured using pycnometer):

| Fiber size | Density (kg/m$^3$) |
|---|---|
| (a) Less 1 mm | 1050 |
| (b) Non filtered | 767 |
| (c) Over 1 mm | 419 |
| (d) Washed | 392 |

Example 13—Molded Article from Pineapple Leaves

Fresh pineapple leaves with a moisture content around 87% w/w were heated at different temperatures [(a) 80° C., (b) 100° C.] for 1 h submerged in water using Klarstein pot (model 10031629). They were then crumbled with 500 W Sammic blender (model TR-550BXL), centrifuged at 1400 rpm, molded manually to get a disc shape, and dried for 24 hours at 50° C. on desiccator. The resulting articles were solid and presented a moisture content of 13% (Velleman Contact hygrometer model DVM125) and the following densities (measured using pycnometer) and values of elasticity modulus and hardness (measured Agilent Nanoindenter model G200):

| Temperature (° C.) | Elasticity (MPa) | Hardness (MPa) | Density (kg/m$^3$) |
|---|---|---|---|
| (a) 80 | 123 | 14 | 804 |
| (b) 100 | 439 | 62 | 772 |

Example 14—Molded Article from a Mix of Pumpkin and Lettuce

Fresh pumpkin with a moisture content of around 96% w/w was heated at 100° C. during 60 minutes submerged in water using Klarstein pot (model 10031629). It was then crumbled with 500 W Sammic blender (model TR-550BXL), centrifuged at 1400 rpm and mixed with lettuce fibers from example 12(d) in the following ratios: (a) 100% Pumpkin, (b) 50% Pumpkin/50% fibers (c) 30% Pumpkin/70% fibers. The resulting mass was molded manually to get a disc shape and dried for 24 hours at 50° C. on desiccator. The resulting article was a solid with a moisture content of 12-15% (Velleman Contact hygrometer model DVM125) and the following densities (measured using pycnometer):

| Sample | Density (kg/m$^3$) |
|---|---|
| (a) | 1235 |
| (b) | 753 |
| (c) | 643 |

Example 15—Molded Articles from Non-Wood Materials from Wood Plants

Fresh apples with a moisture content around 84% were heated at 100° C. for 1 h submerged in water using Klarstein pot (model 10031629). They were then crumbled with 500 W Sammic blender (model TR-550BXL), centrifuged at 1400 rpm, molded manually to get a disc shape, and dried for 24 hours at 50° C. on desiccator. The resulting article was solid and presented a moisture content of 16% (Velleman Contact hygrometer model DVM125) and a density of 1018 kg/m$^3$ (measured using pycnometer).

Example 16—Molded Article from Non-Wood Material from Wood Plant

Fresh apples with a moisture content around 84% w/w were heated at 100° C. for 1 h submerged in water using Klarstein pot (model 10031629). They were then crumbled with 500 W Sammic blender (model TR-550BXL), centrifuged at 1400 rpm, mixed with fibers from example 10(c), molded manually to get a disc shape, and dried for 24 hours at 50° C. on desiccator. The resulting article was solid and presented a moisture content of 11% w/w (Velleman Contact hygrometer model DVM125) and a density of 679 kg/m$^3$ (measured using pycnometer).

Example 17—Molded Article Made from Celery Treated at Various Temperatures

Fresh celery with a moisture content of around 95% w/w was heated at the following temperatures during 1 h submerged in water using Klarstein pot (model 10031629): (a 60°) C., (b 80°) C., (c 100°) C. The, it was crumbled with 500 W Sammic blender model TR-550BXL, centrifuged at 1400 rpm, molded manually to get a disc shape and dried for 24 hours at 50° C. on desiccator. The resulting article was solid with a moisture content of 15% (Velleman Contact hygrometer model DVM125) and the following densities (measured using pycnometer) and values of elasticity modulus and hardness (measured Agilent Nanoindenter model G200):

| Temperature (° C.) | Elasticity (MPa) | Hardness (MPa) | Density (kg/m$^3$) |
|---|---|---|---|
| (a) 60 | 906 | 102 | 950 |
| (b) 80 | 1051 | 87 | 1042 |
| (c) 100 | 3853 | 166 | 1050 |

Example 18—Molded Article from Cauliflower

Fresh white part from cauliflower with a moisture content of around 92% w/w heat at 100° C. for 1 h submerged in water using Klarstein pot (model 10031629), crumbled with 500 W Sammic blender (model TR-550BXL), centrifuged at 1400 rpm, molded manually to get a disc shape, dried for 24 hours at 50° C. on desiccator. The resulting article was solid with a moisture content of 13% (Velleman Contact hygrometer model DVM125), elasticity modulus of 3107 MPa (Agilent Nanoindenter model G200), hardness of 123 MPa (Agilent Nanoindenter model G200), and density of 1051 kg/m$^3$ (measured using pycnometer).

Example 19—Molded Article from Grass

Fresh grass from gardening waste with a moisture content around 84% w/w were heated at 100° C. for 1 h submerged in water using Klarstein pot (model 10031629). They were then crumbled with 500 W Sammic blender (model TR-550BXL), centrifuged at 1400 rpm, mixed with fibers from example 10(c), molded manually to get a disc shape, and dried for 24 hours at 50° C. on desiccator. The resulting article was solid and presented a good consistency and low density

Example 20 (Comparative Example)—Molded Article from Straw

Dried straw with a moisture content around 12% w/w and a lignin content around 21 w/w were heated at 100° C. for 1 h submerged in water using Klarstein pot (model 10031629). They were then crumbled with 500 W Sammic blender (model TR-550BXL), centrifuged at 1400 rpm, molded manually to get a disc shape, and dried for 24 hours at 50° C. on desiccator. The article produced was not solid and consistent enough to be suitable for use in industry.

Example 21—Reprocessing of a Molded Article of the Invention

A molded article made from a fresh whole lettuce according to the method of the example 7 and using a temperature of 100° C. in the heating step, was rehydrated with water with a proportion, at least 3 water:1 dried mass, centrifuged at 1400 rpm, molded manually to get a disc shape, and dried for 24 hours at 50° C. on desiccator. The final solid article presented a moisture content of 13% (Velleman Contact hygrometer model DVM125), and elasticity modulus of 2437 MPa (Agilent Nanoindenter model G200) and a hardness of 153 MPa (Agilent Nanoindenter model G200).

Example 22—Characterizations of Produced Molded Articles

Final Product Hardness, Elasticity Modulus and Density Dependence from Step (b) Temperature Parameter.

Taking values from examples 7 and 8.

| Example | 7(a) | 7(b) | 7(c) | 7(d) | 7(e) | 7(f) | 8(a) | 8(b) |
|---|---|---|---|---|---|---|---|---|
| Temperature (° C.) | 30 | 40 | 60 | 70 | 80 | 100 | 150 | 250 |
| Hardness (MPa) | 14 | 10 | 14 | 159 | X | 145 | 110 | 124 |
| Elasticity Modulus (MPa) | 178 | 158 | 102 | 1723 | X | 4288 | 1464 | 1167 |
| Density (kg/m$^3$) | 309 | 641 | 741 | 811 | 900 | 1072 | 852 | 700 |

Hardness Range

Hardness values, from different examples, describe a continuous range of from 6 MPa to 166 MPa.

| Example | 11(c) | 13(b) | 8(a) | 17(c) |
|---|---|---|---|---|
| Hardness (MPa) | 6 | 62 | 110 | 166 |

Density Range

Density values, from different examples, describe a continuous range of from 419 $kg/m^3$ to 1359 $kg/m^3$.

| Example | 12(c) | 10(b) | 19 | 2 |
|---|---|---|---|---|
| Density ($kg/m^3$) | 419 | 694 | 1051 | 1359 |

Elasticity Modules Range

Elasticity modulus values, from different examples, describe a continuous range of from 123 MPa to 4288 MPa.

| Example | 13(a) | 17(a) | 17(c) | 7(f) |
|---|---|---|---|---|
| Elasticity Mod.(MPa) | 123 | 906 | 3107 | 4288 |

CLAUSES

1. Method for the production of a solid molded article comprising non-wood plant material the method comprising the steps of:
   (a) providing one or more fresh non-wood plant materials having a moisture content from 20% w/w to 99% w/w;
   (b) heating the fresh non-wood plant material at a temperature from 40° C. to 250° C. and a pressure from 40 KPa to 750 KPa, maintaining the moisture content of the material equal to or higher than 20% w/w;
   (c) molding the heated material obtained in step (b); and
   (d) drying the molded material obtained in step (c).
2. The method according to claim 1, wherein the solid molded article comprising non-wood plant material has one or more of:
   i) a density determined using a pycnometer in a range of from 100 $kg/m^3$ to 2000 $kg/m^3$;
   ii) a strength determined using a nanoindenter in a range of from 6 MPa to 250 MPa; and
   iii) an elasticity determined using a nanoindenter in a range of from 50 MPa to 7 GPa.
3. The method according to any of claims 1-2, wherein the one or more fresh non-wood plant material of step (a) has a lignin content lower than or equal to 20% w/w.
4. The method according to any of claims 1-3, wherein the moisture content of the fresh non-wood plant material of step (a) is from 40% w/w to 99% w/w.
5. The method according to any of claims 1-4, wherein the fresh non-wood plant material of step (a) is an agricultural product or agricultural by-product.
6. The method according to any of claims 1-5, wherein the fresh non-wood plant material is from a plant that belongs to a group selected from bryophytes, angiosperms and non-wood gymnosperms.
7. The method according to any of claims 1-6, wherein the step (b) is carried out without the addition of water.
8. The method according to any of claims 1-7, wherein the step (b) is performed at a temperature from 70° C. to 120° C.
9. The method according to any of claims 1-8, wherein the step (b) is performed for a period of time from 0.5 h to 4 h.
10. The method according to any of claims 1-9, wherein the non-wood plant material after the heating step (b) has one or more of:
    i) a moisture content in a range of from 20% to 99% w/w;
    ii) a dewatering value determined by the Schopper-Riegler method in a range of from 20° SR to 100° SR; and
    iii) a viscosity determined by Brookfield method in a range of from 0.001 Pa·s to 15 Pa·s;
11. The method according to any of claims 1-10, which further comprises a cutting step after step (a) and before step (b), or alternatively, after step (b) and before step (c).
12. The method according to any of claims 1-11, which further comprises after step (b) and before step (c) the step of mixing the fresh non-wood plant material with wood plant material, or alternatively, with one or more additives.
13. The method according to any of claims 1-12, which further comprises a pre-drying step after step (c) and before step (d) wherein the moisture content of the molded material is reduced to a value equal to or lower than 40% w/w.
14. The method according to any of claims 1-13, which further comprises one or more times reprocessing the solid molded article comprising non-wood plant material to obtain a reprocessed solid molded article by a process which comprises the following steps after step (d):
    (e) rehydrating the solid molded article and obtaining a rehydrated material;
    (f) molding the rehydrated material obtained in step (e); and
    (g) drying the molded material of step (f).
15. A solid molded article obtainable by the process as defined in any of claims 1-14.

The invention claimed is:

1. A method for the production of a solid molded article comprising non-wood plant material, which is the whole or any part of a non-wood plant, or a non-wood part of a wood plant, the method comprising the steps of:
   (a) providing one or more fresh non-wood plant material having a moisture content from 20% w/w to 99% w/w with respect to the total weight of a plant material, wherein the one or more fresh non-wood plant material is the plant material that after harvesting has not been preserved by drying;
   (b) heating the one or more fresh non-wood plant material at a temperature from 60° C. to 140° C., at a pressure from 40 KPa to 750 KPa, and for at least 0.5 h, and maintaining the moisture content of the one or more fresh non-wood plant material equal to or higher than 20% w/w;
   (c) molding the heated material obtained in step (b); and
   (d) drying the molded material obtained in step (c).

2. The method according to claim 1, wherein the solid molded article comprising non-wood plant material has one or more of:
   i) a density determined using a pycnometer in a range of from 100 $kg/m^3$ to 2000 $kg/m^3$;
   ii) a strength determined using a nanoindenter in a range of from 6 MPa to 250 MPa; and
   iii) an elasticity determined using a nanoindenter in a range of from 50 MPa to 7 GPa.

3. The method according to claim 1, wherein the one or more fresh non-wood plant material of step (a) has a lignin content lower than or equal to 20% w/w.

4. The method according to claim 1, wherein the moisture content of the one or more fresh non-wood plant material of step (a) is from 40% w/w to 99% w/w.

5. The method according to claim 1, wherein the fresh non-wood plant material of step (a) is an agricultural product or agricultural by-product.

6. The method according to claim 1, wherein the one more more fresh non-wood plant material is from a plant selected from a group consisting of bryophytes, angiosperms and non-wood gymnosperms.

7. The method according to claim 1, wherein the step (b) is carried out without the addition of water.

8. The method according to claim 1, wherein the step (b) is performed at a temperature from 70° C. to 120° C.

9. The method according to claim 1, wherein the step (b) is performed for a period of time from 0.5 h to 4 h.

10. The method according to claim 1, wherein the non-wood plant material after the heating step (b) has one or more of:

i) a moisture content in a range of from 20% to 99% w/w;

ii) a dewatering value determined by the Schopper-Riegler method in a range of from 20° SR to 100° SR; and iii) a viscosity determined by Brookfield method in a range of from 0.001 Pa·s to 15 Pa·s.

11. The method according to claim 1, which further comprises a cutting step after step (a) and before step (b), or alternatively, after step (b) and before step (c).

12. The method according to claim 1, which further comprises after step (b) and before step (c) the step of mixing the one or more fresh non-wood plant material with a wood plant material, or alternatively, with one or more additives.

13. The method according to claim 1, which further comprises a pre-drying step after step (c) and before step (d) wherein the moisture content of the molded material is reduced to a value equal to or lower than 40% w/w.

14. The method according to claim 1, which further comprises one or more times reprocessing the solid molded article comprising non-wood plant material to obtain a reprocessed solid molded article by a process which comprises the following steps after step (d):

(e) rehydrating the solid molded article and obtaining a rehydrated material;

(f) molding the rehydrated material obtained in step (e); and (g) drying the molded material of step (f).

15. A solid molded article obtainable by the process as defined in claim 1.

16. The method according to claim 1, wherein the one or more fresh non-wood plant material of step (a) has a lignin content lower than or equal to 20% w/w and a moisture content from 40% w/w to 99% w/w.

17. The method according to claim 1, wherein the one or more fresh non-wood plant material of step (a) has a lignin content lower than or equal to 20% w/w and a moisture content from 40% w/w to 99% w/w, and wherein the step (b) is performed at a temperature from 70° C. to 120° C.

* * * * *